April 12, 1949.　　　G. VAN DAAM　　　2,467,349
ELECTRICALLY HEATED DEVICE
Filed Aug. 13, 1943　　　3 Sheets—Sheet 3
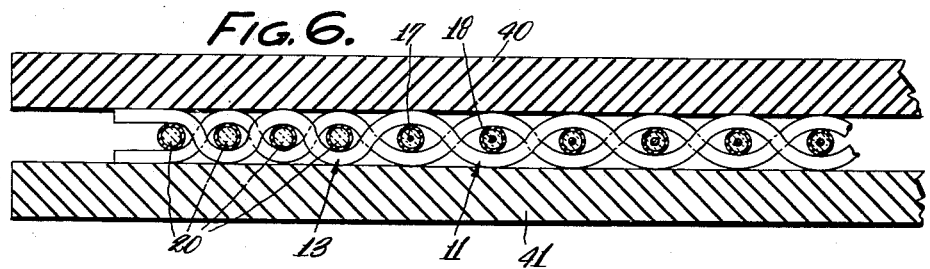
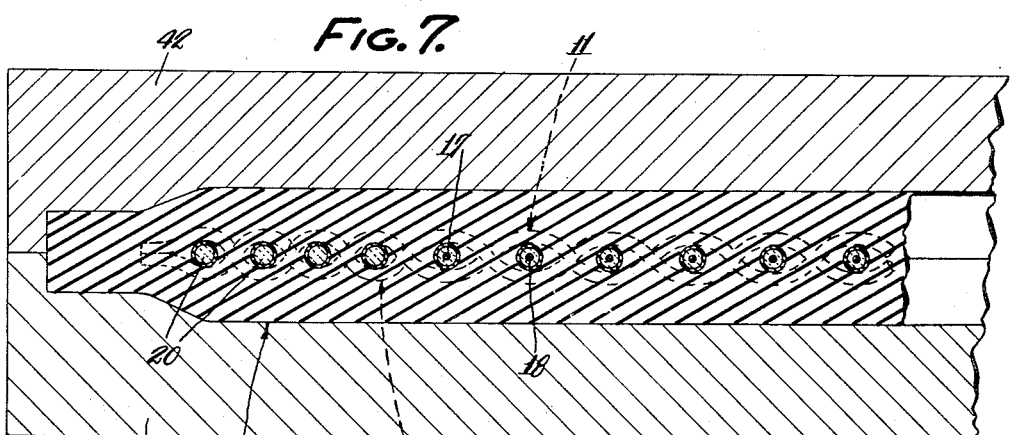
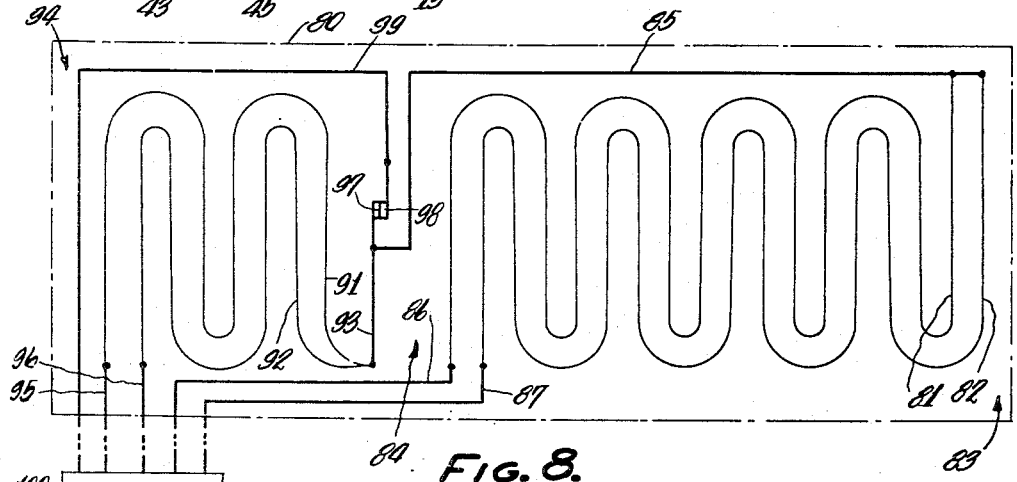
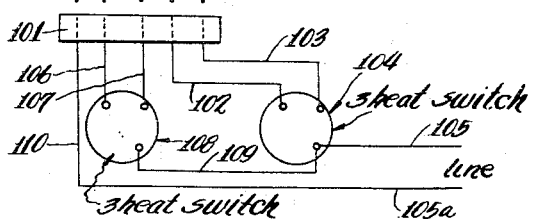
GERRIT VAN DAAM
INVENTOR
ATTORNEYS Patented Apr. 12, 1949

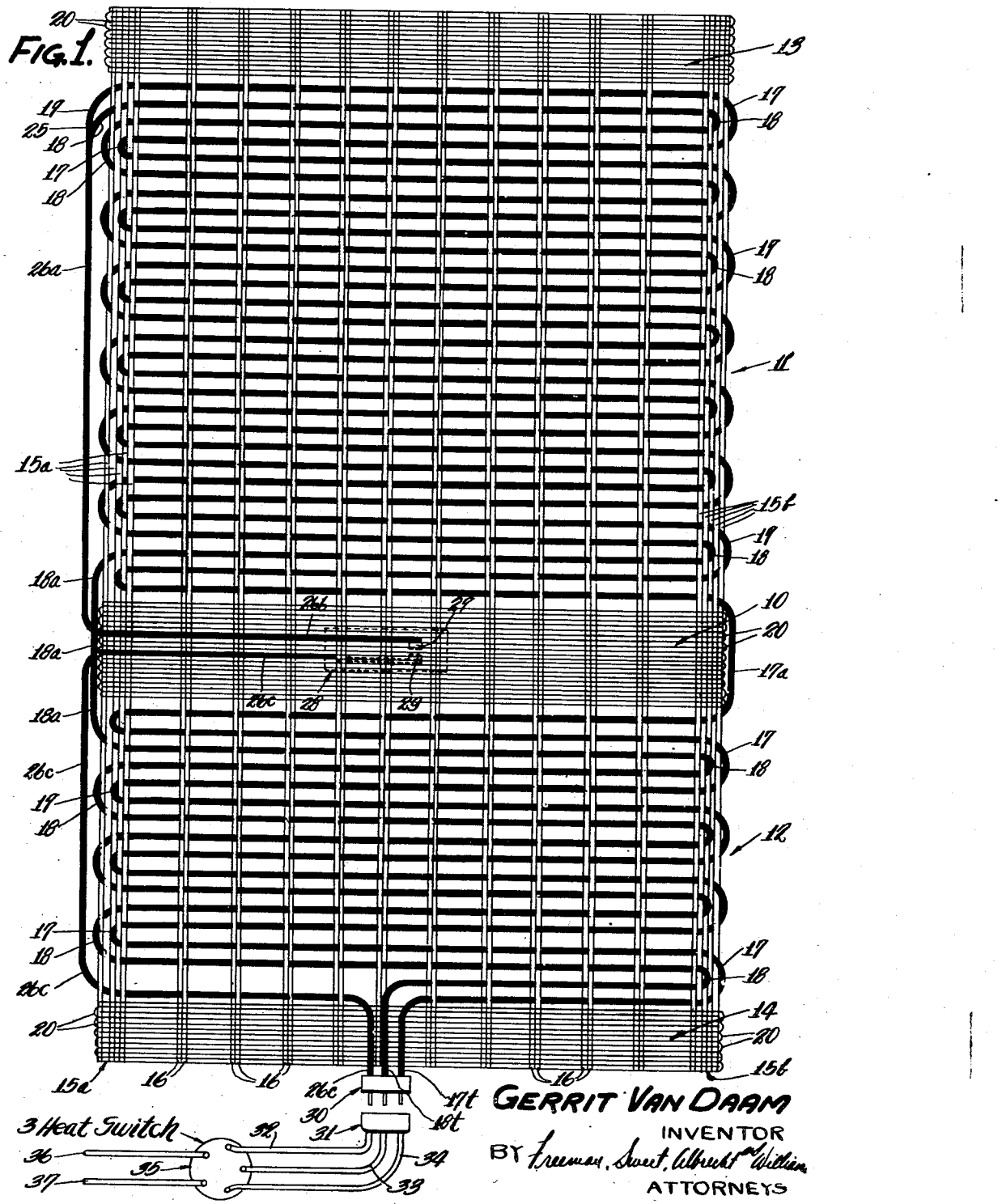

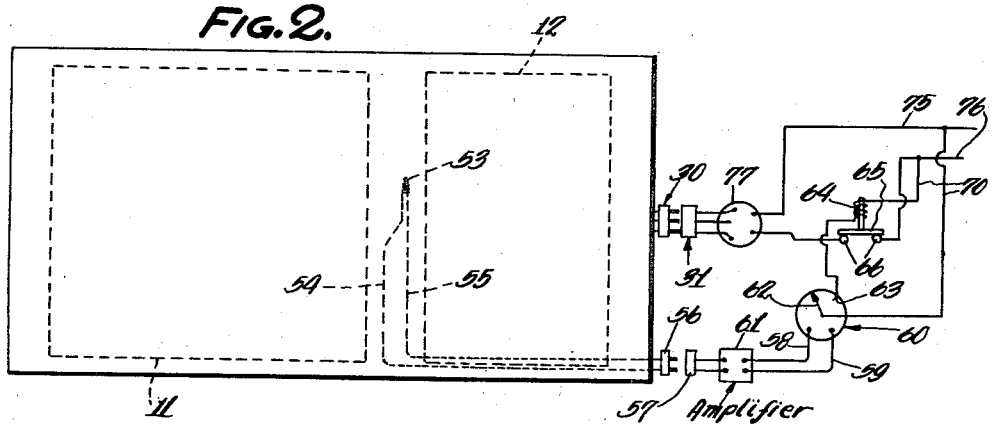
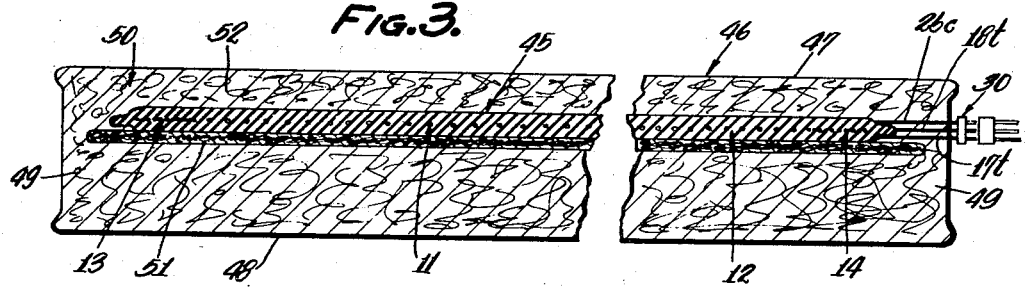
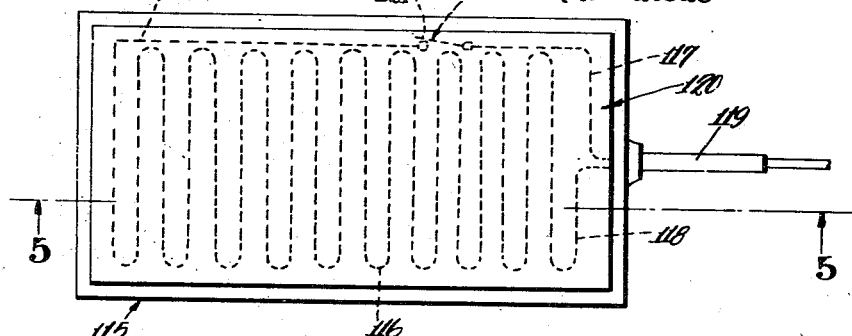
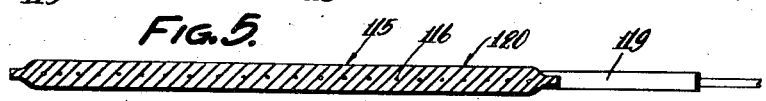

2,467,349

UNITED STATES PATENT OFFICE 2,467,349

ELECTRICALLY HEATED DEVICE

Gerrit Van Daam, Buffalo, N. Y.

Application August 13, 1943, Serial No. 498,460

6 Claims. (Cl. 219—46)

1

This invention relates to electrically heated devices and methods of making them, and more particularly to electrically heated mattresses, pads, and the like. The principal object of the invention is to provide new and improved devices of these types and new and improved methods of making them.

In the drawings accompanying this specification, and forming a part of this application, there are shown, for purposes of illustration, several forms which the invention may assume, and in these drawings:

Figure 1 is a plan view, diagrammatic in part, of an electric heater grid, along with electric circuit control means therefor, particularly adapted for embodiment in a mattress, Figure 2 is a plan view, on a scale smaller than Figure 1, of a mattress, in outline, which may embody a heater grid similar to that shown in Figure 1, Figure 2 showing, diagrammatically, electric control means of different embodiment, Figure 3 is a longitudinal section of a mattress embodying the invention, Figure 4 is a plan view of another embodiment of the invention, Figure 5 is a section taken on the line 5—5 of Figure 4, Figure 6 is a fragmentary enlarged view of section, showing a step in a method of making an electrically heated device in accordance with the invention, Figure 7 is a fragmentary enlarged view in section, showing another step in a method of making an electrically heated device in accordance with the invention, and Figure 8 is an electrical diagram of another embodiment of the invention.

Referring first to Figure 1, this shows, partly diagrammatically, a unitary woven electric heater grid which, if it is to be embodied in a mattress, has an area commensurate with the upper surface of the mattress. A convenient actual size of the grid is approximately five and one-half feet long and somewhat less than three feet wide, but the grid may be larger or smaller depending on the size of the mattress. The heater grid as here shown includes a transverse intermediate portion 10, and portions 11, 12 adjacent the intermediate portion 10, and also end portions 13, 14 at the ends of the portions 11, 12 respectively. The grid as here shown includes warp elements 15a and 15b in the selvedge and a desired plurality of intermediate warp elements 16, all of electrical insulating yarn, preferably of glass fibre, extending the entire length of the weave. The portions 10, 13,

2 and 14, include weft elements 20 of electrical insulating yarn, preferably of glass fibre, interwoven with the warp elements 15a, 16, and 15b. The warp elements 16 are shown as spaced laterally from each other and from the warp elements 15a, 15b, this spacing being any desired, suitable amount. The warp elements 16 are here shown as each comprising two individual strands of yarn, and the warp elements 15a and 15b are here shown as comprising five individual strands of yarn, but in either case any desired, suitable number of strands may be used.

The portions 11, 12 include weft elements 17, 18 interwoven with the warp elements 15a, 16, and 15b. The weft elements 17, 18 are shown in black merely for the purpose of making them stand out so as to be readily traceable. The weft elements 17, 18 each comprise electric resistance wire. By wire is meant either stranded wire, or solid, round section wire, or any suitable form of resistance conductor adapted for weaving. Each wire is preferably primarily coated with an insulating covering, preferably of glass fibre, which may be subsequently coated with rubber as hereinbefore set forth. The weft elements appear more or less diagrammatically in section in Figure 6 and there are shown as comprising a wire covered with glass fibre in turn covered with rubber. The weft elements 17, 18 are preferably of different electrical resistance and are here shown as electrically connected at 25 to a common lead conductor 26a. From the point 25 the weft elements 17, 18 are laterally spaced from each other longitudinally with respect to the length of the weave any desired suitable distance, and run collaterally back and forth and are interwoven with the warp elements 15a, 16, and 15b until they reach the intermediate portion 10. Here the weft element 18 extends, as the portion 18a, longitudinally of the weave at the margin of the left hand selvedge of the portion 10, and the weft element 17 extends, as the portion 17a, longitudinally of the weave at the right hand selvedge of the portion 10. The portions 17a and 18a merge with the weft elements 17, 18 in the portion 12 and in that portion they run collaterally and are interwoven with the warp elements 15a, 16, and 15b as in the portion 11. The terminal ends 17t and 18t of the weft elements 17, 18 are carried out of the weave adjacent to the portion 14 or, if desired, may be longitudinally interwoven with one or more of the weft elements 20 of the portion 14.

The longitudinal extent of the portion 12 is here shown as about one-half of that of the portion 11, but other proportions may be used. The longitudinal width of the portions 10, 13, and 14 need not in an actual grid be as large a percentage of the total length of the grid as shown in Figure 1.

The lead conductor 26a, though it may be and preferably is disposed on top of the left hand selvedge is here shown as disposed along the edge of the selvedge for the sake of clearness. The lead conductor 26a is here shown as merging with a portion 26b carried over and on top of the portion 10 and leading to and electrically connected to a contact 27 of a thermoresponsive cut-out 28 which desirably has a casing as indicated by the dotted rectangle. The thermoresponsive cut-out 28 has a movable contact 29 to which is electrically connected a lead conductor 26c which extends from the contact 29, on top of the portion 10 transversely outwardly, then longitudinally along the left hand selvedge, then transversely along the portion 14 where it may be interwoven with the warp elements 15a and 16. The conductor 26c as well as the terminals 17t, 18t of the weft elements 17, 18 may be carried out of the weave in any desired, suitable way and the conductor 26c and terminals 17t, 18t are electrically connected to the respective prongs of a plug 30.

The portion of the lead conductor 26c running along the left hand selvedge is shown separated from the selvedge for the sake of clearness, but this portion as well as the lead conductor 26a may be and preferably is disposed on top of the selvedge. In any event, before the grid shown in Figure 1 is embedded in rubber or the like, as hereinafter described, it is preferred but not essential to hold the lead conductors in place along the selvedge with insulating yarn (not shown) looped in any suitable way about the selvedge and the lead conductors.

It will be understood that the lead conductors 26a, 26b, 26c are preferably of relatively high conductivity and heavier than the wire in the weft elements 17, 18. The terminal portions 17t, 18t preferably are connected to such lead conductors leading to the plug 30.

The plug 30 is cooperable with a socket 31 to which are connected conductors 32, 33, 34 in turn connected to respective terminals of a switch 35 which is a so-called 3-heat switch various kinds of which are well known to those skilled in the art. The switch 35 has terminals connectable to line conductors 36, 37. The 3-heat switch 35 is of any suitable type whereby the line conductors 36, 37 may be electrically connected so that the weft element 17 only is fed with current, or the weft element 18 only is fed with current, or both the weft elements 17, 18 are fed with current. It will be evident that especially if electromotive force of but one magnitude is available, as from a single pair of line conductors, it is preferable to make the weft elements 17, 18 of different electric resistance, so that the grid area may be heated to any selected one of a plurality of different maximum temperatures, in this instance, three. If more than one electromotive force is available the weft elements 17, 18 may be made of the same resistance if desired and different heats obtained by application of different electromotive forces.

The thermal cut-out 28 is so constructed and arranged that the contacts 27, 29 will be disengaged when a maximum safe temperature is reached.

The grid having been constructed as hereinbefore described in connection with Figure 1, it is dipped or otherwise coated with latex-type material, either natural or synthetic, such as natural or synthetic rubber latex, vulcanizable, or other suitable material. The so-coated grid may then be vulcanized, or it may be laid on a suitable flat surface and a mass of latex-type material applied to the top side, or, instead, a sheet of unvulcanized rubber or rubber-type material placed on the top side. This first assembly is then placed under pressure, whereby the said mass or sheet as the case may be is impressed into and adheres to the coated grid. This assembly may be then turned over and a mass of latex-type material applied to the upturned side, or, instead, a sheet of unvulcanized rubber or rubber-type material placed on the upturned side. This second assembly is then vulcanized under pressure in a mold. The process may be simplified by disposing the woven grid, coated with latex-type material which preferably but not necessarily has been vulcanized, between two sheets of unvulcanized rubber 40, 41, as diagrammatically indicated in Figure 6, then placing this assembly in a mold comprising parts 42, 43 and vulcanizing this assembly under pressure in the mold, to bring the assembly to the form diagrammatically indicated in Figure 7. In either of the described methods the woven grid and the embedding rubber become a solid unitary mass or pad 45, the interstices in the woven grid being filled with rubber. The lead conductors 26a, 26b, 26c, 17t, 18t are also embedded in the rubber mass. The thermoresponsive means 28 is of course also embedded in the unitary pad by the described methods.

Figure 3 shows a longitudinal section of a mattress 46 in which a pad such as 45 is embodied. The mattress 46 may comprise an upper wall 47, and an under wall 48 generally parallel to the wall 47, and a circumscribing side wall 49. The walls 47, 48, 49 may be made of ticking or other suitable material. The mattress may be filled with a filling 50 of sisal, hair, moss, or other suitable filling material. The pad 45 is embedded in the filling 50, and the principal thickness of the filling may be below the pad 45. Desirably, a sheet of asbestos 51 or other suitable heat insulating material preferably non-inflammable, desirably of somewhat larger area than the pad 45, is interposed between the under side of the pad 45 and the filling 50. If desired the pad 45 may be fastened to the sheet 51 with thread or cord or in any other desired way. If desired, the filling 52 adjacent the upper side of the pad 45 may be made of fibrous non-inflammable material of any suitable kind.

A mattress constructed as hereinbefore described has many advantages among which are safety from short circuits and absence of corrosion of the wires and other conductors; resilience and resultant comfort for the user while at the same time the strains put upon the pad 45 will not result in breakage of the conductors (resistance wire or lead conductors) nor in relative shifting of the parts of the conductors with respect to each other, nor with respect to the supporting means for the conductors. The pad 45 is highly flexible in all directions without resulting in any undesirable displacement of the parts thereof, and is sufficiently strong to withstand the great stresses put upon it by the weight of a person lying on the mattress, including the bending and tensile stresses due to the shifting of the person's weight. The pad 45 and the electrical connections thereto are waterproof.

The conductors 26c, 17t, and 18t have been shown in Figures 1 and 3 as separate but they may be twisted together and covered, so as to constitute a flexible cable or cord extending from the side wall 49 to any desired suitable length and leading and connected to the plug 30.

Instead of the thermal cut-out 28 interposed in the lead conductor 26a—26c, thermoresponsive means either suitable for mechanical or electrical remote control of switch means may be used. In the illustrated instance shown in Figure 2 a thermocouple 53 is indicated. The thermo-couple 53 has conductors 54, 55 connected to its terminals and leading to a plug 56 cooperable with a socket 57 connected by conductors 58, 59 to a milliammeter or any other suitable electric current responsive indicating means 60. Desirably the thermo-couple 53 and the conductors 54, 55 are embedded in the mass of rubber which embeds the woven grid. If desired a current amplifier 61 may be interposed in the conductors 58, 59. The indicating means 60 is here shown as provided with a pointer 62 cooperable with a relatively stationary adjustable contact 63. The pointer 62 and contact 63 are interposed in a circuit 70 which includes an operating coil 64 which when energized is adapted to lift a bridging contact 65 out of engagement with relatively stationary contacts 66. The circuit 70 is here shown as connected to and feedable from the line wires 75, 76 and the relay contacts 65, 66 as interposed in the line wire 76. The line wires 75, 76 are connected to a 3-heat switch 77 in turn connected to a socket 31 connectable to the plug 30 which may be electrically connected to the resistance wires as in Figure 1. If the thermal cut-out 28 is omitted, the lead conductor 26a, 26b, 26c of course does not need to extend into the portion 10 but may be continuous along the selvedge from the point 25 to the portion 14, to the plug 30.

The embodiment of Figure 2 is particularly advantageous in treating hospital patients where a particular temperature at the surface 47 of the mattress is desired. The apparatus may be calibrated to determine what temperature at the surface will result from a given temperature at the thermo-couple 53. For example, the temperature at the thermo-couple may be at, say, 140° F. which in a particular embodiment will result in a maximum temperature of 115° F. at the surface of the mattress after stable heat dissipating conditions have been reached. The dial of the instrument 60 may be calibrated to read in degrees of mattress surface temperature in a range from the lowest to the highest temperature, and the contact 63 adjusted to a selected desired temperature. Naturally the maximum surface temperature will be determined by the maximum safe temperature at the thermo-couple 53.

Referring to the embodiment shown in Figure 8, the dot-and-dash line 80 indicates the outline of a unitary woven electric heater grid which may be embedded in rubber as hereinbefore described. The unitary grid of Figure 8 has weft elements comprising electric resistance wire 81, 82 which run collaterally back and forth across the weave in the same manner as the weft elements 17, 18 of Figure 1 but the weft elements 81, 82 cover only the portion of the weave from an end portion 83 to an intermediate portion 84 (corresponding respectively to the end portion 13 and the intermediate portion 10 of Figure 1). The weft elements 81, 82 have ends electrically connected to a common lead conductor 85, the other ends adjacent the intermediate portion 84 being connected to lead conductors 86, 87.

The unitary grid 80 also includes weft elements comprising electric resistance wire 91, 92 having ends adjacent the intermediate portion 84 electrically connected to a common lead conductor 93. The weft elements 91, 92 cover the area between the intermediate portion 84 and an end portion 94 (corresponding to the end portion 14 of Figure 1) and at the end portion 94 are connected to lead conductors 95, 96 respectively.

The lead conductors 85, 93 are here shown as connected to a contact 97 of a thermal cut-out. The other contact, 98, of the thermal cut-out is connected to a common lead conductor 99. The lead conductors 86, 87, 95, 96, 99 may be conveniently brought out so as to form a cable the conductors of which are connected to the respective prongs of a 5-prong plug 100. The prongs of the plug 100 are respectively cooperable with the holes of a 5-hole socket 101. Conductors 102, 103 leading from the socket 101 are connected to two terminals respectively of a 3-heat switch 104, another terminal of the switch 104 being connected to a line conductor 105. Conductors 106, 107 leading from the socket 101 are connected to two terminals respectively of a 3-heat switch 108, another terminal of the switch 108 being connected by a jumper 109 to the line 105. The remaining conductor, 110, from the socket 101 is here shown as electrically common with the other line conductor 105a. Thus the socket 101 and plug 100 are so constructed and arranged that conductors 110, 106, 107, 102, 103 are connectable to lead conductors 99, 95, 96, 86, and 87 respectively.

It will be evident that when the contacts 97, 98 are in engagement, the common lead conductor 99 is adapted to feed into either the conductor 85 or the conductor 93 or both. The 3-heat switch 104 may be turned so that only the weft element 81 is fed with current, or only the weft element 82, or both of these weft elements, thereby heating the portion between the intermediate portion 84 and the end portion 83 to any selected one of a plurallity of different maximum temperatures, in this instance three. In like manner the 3-heat switch 108 may be turned so that only the weft element 91 is fed with current, or only the weft element 92, or both of these weft elements, thereby heating the portion between the end portion 94 and the intermediate portion 84 to any selected one of a plurality of different maximum temperatures, in this instance three. It will of course be evident that either of the switches 104, 108 may be in the "off" position while the other is in any selected "on" position, or both may be in any selected "on" position. The embodiment of Figure 8 enables heating only mainly the trunk of the body of a patient, or only mainly the legs and feet of the patient, or heating both trunk and legs and feet but at different temperatures, or heating both trunk and legs and feet at the same temperature.

It will be evident that instead of the thermal cut-out 97—98, a thermally responsive device such as the thermo-couple 53 of Figure 2 may be utilized and the thermo-couple arranged to control the current through the resistance wires as described in connection with Figure 2. If desired more than one thermo-couple may be provided respectively responsive to the temperature at different portions of the heater grid.

The method of making unitary woven heater grids embedded in rubber or the like may be carried out with respect to other forms of woven grids. In Figure 4 is shown, for example, a pad 115 which embodies a grid woven analogously to the grid of Figure 1 but in which there is but one weft element comprising an electric resistance wire 116. A lead conductor 117 is connected to one end of the wire 116 and a lead conductor 118 is connected to the other end of the wire 116. The lead conductors 117, 118 may be brought out through and molded in a rubber extension 119 integral with the rubber mass 120 in which the woven heater grid is embedded. The lead conductors 26, 17t, 18t of Figures 1, 2, and 3 and the lead conductors 99, 95, 96, 86, 87 of Figure 8 may be similarly brought out from the respective grids in a rubber extension integral with the mass of rubber embedding the grid, similarly to the extension 119 and mass 120.

An embedded thermal cut-out 121 is here shown as interposed in the lead conductor 117 but may be interposed at any other desired position in the circuit.

Heating devices in accordance with the invention, particularly the simpler forms as in Figures 4 and 5, may be used as heated mats, as in front of hotel doorways, etc., or for policemen to stand on, or under fabric rugs or mats, or encased in fabric, or in any other desired suitable relation.

From the foregoing it will be apparent to those skilled in the art that each of the illustrated embodiments of the invention provides a new and improved electrically heated device and accordingly, each accomplishes the principal object of the invention. On the other hand, it also will be obvious to those skilled in the art that the illustrated embodiments of the invention may be variously changed and modified, or features thereof, singly or collectively, embodied in other combinations than those illustrated, without departing from the spirit of the invention, or sacrificing all of the advantages thereof, and that accordingly, the disclosure herein is illustrative only, and the invention is not limited thereto.

I claim:

1. An electric heater grid comprising a unitary woven fabric having a transverse first portion intermediate a second portion and a third portion, said first portion having warp elements and weft elements both of yarn of insulating material, said second and third portions having warp elements common with those of said first portion, and said second and third portions each having two spaced collaterally running weft elements each comprising electric resistance wire, said weft elements of said second portion being respectively continuous with said weft elements of said third portion, one of the weft elements of said second portion being joined to one of the weft elements of said third portion along one selvedge of said first portion, and the other weft element of said second portion being joined to the other weft element of said third portion along the other selvedge of said first portion.

2. A mattress having upper and under surfaces and having between said surfaces electric heating means submerged by mattress-filling material; thermally responsive means, disposed at a place adjacent said heating means, constructed and arranged to produce an effect varying with the temperature at said place; and indicating means responsive to said effect and constructed and arranged to indicate the temperature at said upper surface.

3. An electric heater grid comprising a unitary woven fabric having a transverse first portion intermediate a second portion and a third portion, said first portion having warp elements and weft elements both of yarn of insulating material, said second and third portions having warp elements common with those of said first portion, and said second and third portions each having two spaced collaterally running weft elements each comprising electric resistance wire, the collaterally running weft elements of said second portion progressing from terminal ends at the free end of said second portion in a direction toward the free end of said third portion, the collaterally running elements of said third portion progressing in said direction to terminals at the free end of said third portion, and said weft elements of said third portion being respectively continuous with said weft elements of said second portion, one of the weft elements of said second portion being joined to one of the weft elements of said third portion along one selvedge of said first portion, and the other weft element of said second portion being joined to the other weft element of said third portion along the other selvedge of said transverse portion.

4. An electric heater grid comprising a unitary woven fabric having a transverse first portion intermediate a second portion and a third portion, said first portion having warp elements and weft elements both of yarn of insulating material, said second and third portions having warp elements common with those of said first portion, said second and third portions having weft elements comprising electric resistance wire; lead conductor means, for carrying electric current to said electric resistance wires, disposed along a selvidge portion of said fabric and extending from a terminal at the free end of said third portion to the free end of said second portion and there electrically connected to a weft element of said second portion; said lead conductor means having a loop portion extending laterally therefrom, over said first portion; and thermoresponsive electric switch means disposed at said first portion and interposed in said loop portion of said lead conductor means.

5. An electric heater grid comprising a unitary woven fabric having a transverse first portion intermediate a second portion and a third portion, said first portion having warp elements and weft elements both of yarn of insulating material, said second and third portions having warp elements common with those of said first portion, and said second and third portions each having two spaced collaterally running weft elements each comprising electric resistance wire, the collaterally running weft elements of said second portion progressing from terminal ends at the free end of said second portion in a direction toward the free end of said third portion, and the collaterally running elements of said third portion progressing in said direction to terminal ends at the free end of said third portion; lead conductor means, for carrying electric current to said electric resistance wires, disposed along a selvedge portion of said fabric and extending from a terminal at the free end of said third portion to the free end of said second portion and there electrically connected to both of the weft elements of said second portion; said lead conductor having a loop portion extending laterally therefrom, over said first portion; and thermoresponsive electric switch means disposed at said first portion and interposed in said loop portion of said lead conductor means.

6. An electric heater made from a continuously woven fabric, the fabric including warp elements and weft elements of insulating material, and weft elements of electric resistance wire progressing continuously in the same direction in said fabric, said fabric having at least one transversely extending selvedged portion, between longitudinally spaced transversely extending selvedged portions, in which said electric resistance wire weft elements extend outside of the selvedge of said at least one transverse portion.

GERRIT VAN DAAM.

REFERENCES CITED

The following references are of record in the file of this patent:

UNITED STATES PATENTS

| Number | Name | Date |
|---|---|---|
| 718,896 | Ames et al. | Jan. 20, 1903 |
| 723,797 | Williams | Mar. 24, 1903 |
| 1,031,204 | Schniewindt | July 2, 1912 |
| 1,036,632 | Jahr | Aug. 27, 1912 |
| 1,368,412 | Rohne | Feb. 15, 1921 |
| 1,379,356 | Negromanti | May 24, 1921 |
| 1,456,223 | Craddick et al. | May 22, 1923 |
| 1,655,838 | Lackland | Jan. 10, 1928 |
| 1,741,054 | Graham | Dec. 24, 1929 |
| 1,837,117 | Dunbar | Dec. 15, 1931 |
| 1,921,343 | Burkholder | Aug. 8, 1933 |
| 2,018,512 | De Laney et al. | Oct. 22, 1935 |
| 2,025,586 | Hall | Dec. 24, 1935 |
| 2,138,745 | Pecker | Nov. 29, 1938 |
| 2,162,021 | Kidwell | June 13, 1939 |
| 2,251,697 | Van Daam et al. | Aug. 5, 1941 |
| 2,289,151 | Teague et al. | July 7, 1942 |
| 2,298,181 | Stranszky | Oct. 6, 1942 |